US012739060B2

(12) United States Patent
Li et al.

(10) Patent No.: US 12,739,060 B2
(45) Date of Patent: Sep. 15, 2026

(54) PACKET LOSS INDICATION METHOD AND RELATED DEVICE

(71) Applicant: HUAWEI TECHNOLOGIES CO., LTD., Shenzhen (CN)

(72) Inventors: Chenwan Li, Beijing (CN); Feng Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 673 days.

(21) Appl. No.: 18/180,989

(22) Filed: Mar. 9, 2023

(65) Prior Publication Data

US 2023/0216611 A1 Jul. 6, 2023

Related U.S. Application Data

(63) Continuation of application No. PCT/CN2020/114747, filed on Sep. 11, 2020.

(51) Int. Cl.
*H04L 1/1607* (2023.01)
*H04W 28/04* (2009.01)

(52) U.S. Cl.
CPC ........... *H04L 1/1628* (2013.01); *H04W 28/04* (2013.01)

(58) Field of Classification Search
CPC . H04W 36/02; H04W 36/0079; H04W 76/22; H04W 76/40; H04W 36/0007; H04W 76/11; H04W 36/16; H04W 36/0058; H04W 36/08; H04W 84/045; H04W 88/08; H04W 88/16; H04W 28/04; Y02D 30/70; H04L 1/1671; H04L 1/1628; H04L 2001/0097; H04L 43/0835; H04L 41/5067; H04L 5/0055; H04L 1/1861
USPC ......................................... 370/328, 329, 330
See application file for complete search history.

(56) References Cited

U.S. PATENT DOCUMENTS

| | | | | |
|---|---|---|---|---|
| 9,609,551 | B2 * | 3/2017 | Neubacher | H04L 41/5029 |
| 9,730,118 | B2 * | 8/2017 | Ganapathy | H04W 36/0058 |
| 2013/0021921 | A1 * | 1/2013 | He | H04L 5/0055 370/242 |
| 2016/0226628 | A1 | 8/2016 | Stephenne et al. | |
| 2019/0200251 | A1 | 6/2019 | Shi et al. | |

(Continued)

FOREIGN PATENT DOCUMENTS

| | | | |
|---|---|---|---|
| CN | 107734562 | A | 2/2018 |
| CN | 108809489 | A | 11/2018 |

(Continued)

OTHER PUBLICATIONS

Extended European Search Report issued in corresponding European Application No. 20952819.9, dated Aug. 25, 2023, pp. 1-14.

*Primary Examiner* — David Q Nguyen
(74) *Attorney, Agent, or Firm* — HAUPTMAN HAM, LLP

(57) ABSTRACT

In a packet loss indication method, a user plane function (UPF) entity receives first indication information from a first base station, where the first indication information indicates that a first data packet was unsuccessfully sent, and that the first data packet was unsuccessfully sent includes that the UPF entity unsuccessfully sent the first data packet to the first base station or the first base station unsuccessfully sent the first data packet to a first terminal device. Second indication information is sent to a second base station, where the second indication information indicates that the first data packet was unsuccessfully sent.

14 Claims, 6 Drawing Sheets

(56) References Cited

U.S. PATENT DOCUMENTS

| | | | | |
|---|---|---|---|---|
| 2020/0187065 | A1 | 6/2020 | Hayashi | |
| 2020/0280898 | A1* | 9/2020 | Liu | H04L 1/1825 |

FOREIGN PATENT DOCUMENTS

| | | | | | |
|---|---|---|---|---|---|
| CN | 109672929 | A | * | 4/2019 | H04N 21/64 |
| CN | 109803296 | A | | 5/2019 | |
| EP | 2932655 | A1 | | 10/2015 | |
| EP | 2932656 | A1 | | 10/2015 | |
| EP | 2988549 | A1 | * | 2/2016 | H04W 72/23 |
| EP | 3334213 | A1 | | 6/2018 | |
| EP | 2934044 | B1 | * | 8/2018 | H04W 36/00695 |
| KR | 20190056074 | A | * | 5/2019 | H04W 56/002 |
| WO | 2014095493 | A1 | | 6/2014 | |
| WO | WO-2014095492 | A1 | * | 6/2014 | H04L 12/1435 |

* cited by examiner

PACKET LOSS INDICATION METHOD AND RELATED DEVICE

CROSS-REFERENCE TO RELATED APPLICATIONS

This application is a continuation of International Application No. PCT/CN2020/114747, filed on Sep. 11, 2020, the disclosure of which is hereby incorporated by reference in its entirety.

TECHNICAL FIELD

This application relates to the field of network technologies, and in particular, to a packet loss indication method and a related device.

BACKGROUND

To-business (2B) services are sensitive to end-to-end latency and reliability. In addition, available spectrum resources in a factory are limited and precious. Services in the factory may be approximately classified into three types: remote control (RC), control to control (C2C), and motion control (MC). In a 2B scenario in the industry, consecutive loss of a plurality of data packets may cause a breakdown of a production line. A data packet transmitted between two terminal devices may pass through the air interface twice, and transmission states of two links are independent of each other. Each network node cannot obtain a transmission state of each link, and data transmission reliability cannot be ensured.

SUMMARY

Embodiments of this application provide a packet loss indication method and a related device, to improve transmission reliability.

According to a first aspect, at least one embodiment of this application provides a packet loss indication method. The method includes: A core network device receives first indication information from a first base station. The first indication information indicates that a first data packet is unsuccessfully sent, and that the first data packet is unsuccessfully sent includes that the core network device unsuccessfully sends the first data packet to the first base station or the first base station unsuccessfully sends the first data packet to a first terminal device. The core network device sends second indication information to a second base station. The second indication information indicates that the first data packet is unsuccessfully sent. If a transmission state of a data packet on a second link is obtained through a network node on a first link, the data packet may be transmitted in a high-reliability transmission manner based on the transmission state of the data packet on the second link if the data packet on the second link is unsuccessfully transmitted. In this way, different links are associated to improve reliability of network transmission.

In a possible design, the second indication information includes one or more of the following: a serial number of the at least one first data packet, a bearer identifier corresponding to the first data packet, a quantity of the at least one first data packet, and a quantity of consecutively or accumulatively lost data packets before the first data packet.

In another possible design, the first indication information includes one or more of the following: a serial number of the at least one first data packet, a bearer identifier corresponding to the first data packet, a quantity of the at least one first data packet, and a quantity of consecutively or accumulatively lost data packets before the first data packet.

In another possible design, the core network device receives a second data packet from the second base station; determines whether a serial number of the received second data packet is consecutive; and if the serial number of the received second data packet is not consecutive, determines that a previous data packet of the first data packet is unsuccessfully sent, and may indicate a quantity of data packets that are unsuccessfully sent accumulatively before the first data packet, or a quantity of data packets that are unsuccessfully sent consecutively before the first data packet. Whether the second base station successfully sends the data packet to the core network device is determined by determining continuity of a serial number of the data packet, to improve transmission reliability.

In another possible design, the core network device sends third indication information to the first base station, where the third indication information indicates that the second base station unsuccessfully sends a fourth data packet to the core network device or a second terminal device unsuccessfully sends a fourth data packet to the second base station.

In another possible design, the third indication information includes one or more of the following: a serial number of the at least one fourth data packet, a bearer identifier corresponding to the fourth data packet, a quantity of the at least one fourth data packet, and a quantity of consecutively or accumulatively lost data packets before the fourth data packet.

In another possible design, the core network device determines, if a second data packet sent by the second base station is not received before a preset moment, that the second data packet is unsuccessfully sent. Whether the second base station successfully sends the data packet to the core network device is determined through a service cycle, to improve transmission reliability.

In another possible design, the core network device sends a third data packet to the first base station, where the third data packet includes at least one serial number, the serial number is carried in a header or a data payload of the third data packet, and the third data packet is for indicating that a data packet corresponding to the serial number is unsuccessfully sent. The header or the data payload is for indicating that the data packet is unsuccessfully sent, so that a next network node performs data transmission based on information indicated by the header or the data payload, to improve transmission reliability.

In another possible design, the core network device sends a third data packet to the first base station, where the third data packet includes fourth indication information, and the fourth indication information indicates that a previous data packet of the third data packet is unsuccessfully sent, indicates a serial number of a data packet that is unsuccessfully sent before the third data packet, indicates a quantity of data packets that are unsuccessfully sent accumulatively before the third data packet, or indicates a quantity of data packets that are unsuccessfully sent consecutively before the third data packet. The indication information indicates that the data packet is unsuccessfully sent, so that a next network node performs data transmission based on the indication information, to improve transmission reliability.

In another possible design, before performing packet loss indication, the core network device determines an association relationship between two links. The association relationship may be specifically that a PDU session of UE 1 between the first base station and the core network device corresponds to a PDU session of UE 2 between the second base station and the core network device. Alternatively, the association relationship may be that a first bearer of the UE 1 between the first base station and the core network device corresponds to a second bearer of the UE 2 between the second base station and the core network device. In addition, the association relationship may further include an association of a start serial number of a data packet. For example, GTP-U SN=1 of service transmission of the UE 1 between the first base station and the core network device corresponds to GTP-U SN=1 of service transmission of the UE 2 between the second base station and the core network device. In other words, the core network device needs to determine the association relationship between the two links. A data packet 1 received by the core network device from the first base station corresponds to a data packet 1 sent by the core network device to the second base station.

According to a second aspect, at least one embodiment of this application provides a packet loss indication method. The method includes: A first base station determines that a core network device unsuccessfully sends a first data packet to the first base station, or that the first base station unsuccessfully sends a first data packet to a first terminal device. The first base station sends first indication information to the core network device. The first indication information indicates that the first data packet is unsuccessfully sent. If a transmission state of a data packet on a second link is obtained through a network node on a first link, the data packet may be transmitted in a high-reliability transmission manner based on the transmission state of the data packet on the second link if the data packet on the second link is unsuccessfully transmitted. In this way, different links are associated to improve reliability of network transmission.

In a possible design, the first base station receives a state report sent by the first terminal device; and determines, based on the state report, that the first base station unsuccessfully sends the first data packet to the first terminal device. The following several optional manners are included.

In a first optional manner, if packet loss occurs on a data packet received by the first terminal device (for example, a serial number of the received data packet is not consecutive), reporting of a state report to the first base station is triggered on a PDCP layer of the first terminal device. Alternatively, after discontinuous data packets occur, a timer is started, and reporting of the state report is triggered after the timer reaches a preset time.

In a second optional manner, after receiving a PDCP PDU, the first terminal device starts a timer, and if no data packet sent by the first base station is received within a service cycle, the first terminal device triggers sending of the state report to the first base station.

In a third optional manner, the first base station may send a polling indication to the first terminal device, and after receiving the polling indication, the first terminal device sends the state report to the first base station.

In a fourth optional manner, the first terminal device triggers reporting of the state report when determining that a quantity of lost packets reaches a preset quantity. For example, the first terminal device may trigger reporting of the state report when N consecutive packets are lost, or may trigger reporting of the state report when N packets are lost accumulatively.

In another possible design, the state report includes a serial number of a data packet currently received by the first terminal device or a serial number of a data packet that is not received by the first terminal device.

In another possible design, the first base station receives a hybrid automatic repeat request HARQ feedback sent by the first terminal device, where the HARQ feedback is for determining that a radio access control MAC protocol data unit PDU is unsuccessfully sent; and determines, based on the MAC PDU, that the first base station unsuccessfully sends the first data packet to the first terminal device.

In another possible design, the first base station receives the first data packet sent by the core network device; determines whether a serial number of the received first data packet is consecutive; and if the serial number is not consecutive, determines that a previous data packet of the first data packet is unsuccessfully sent. Whether the core network device successfully sends the data packet to the first base station is determined by determining continuity of a serial number of the data packet, to improve transmission reliability.

In another possible design, the first base station determines, if the first data packet sent by the core network device is not received before a preset moment, that the first data packet is unsuccessfully sent. Whether the core network device successfully sends the data packet to the first base station is determined through a service cycle, to improve transmission reliability.

According to a third aspect, at least one embodiment of this application provides a packet loss indication method. The method includes: A second base station receives second indication information from a core network device. The second indication information indicates that a first data packet is unsuccessfully sent, and that the first data packet is unsuccessfully sent includes that the core network device unsuccessfully sends the first data packet to a first base station or a first base station unsuccessfully sends the first data packet to a first terminal device. If a transmission state of a data packet on a second link is obtained through a network node on a first link, the data packet may be transmitted in a high-reliability transmission manner based on the transmission state of the data packet on the second link if the data packet on the second link is unsuccessfully transmitted. In this way, different links are associated to improve reliability of network transmission In a possible design, the second indication information includes a serial number of at least one first data packet, a quantity of the at least one first data packet, or a bearer identifier corresponding to the first data packet, and the serial number is for indicating that the first data packet is unsuccessfully sent.

In a possible design, the second indication information further includes a quantity of consecutively or accumulatively lost data packets before the first data packet.

In a possible design, the second base station receives a fifth data packet from a second terminal device; determines whether a serial number of the received fifth data packet is consecutive; and if the serial number is not consecutive, determines that a previous data packet of the fifth data packet is unsuccessfully sent. Whether the second terminal device successfully sends the data packet to the second base station is determined by determining continuity of a serial number of the data packet, to improve transmission reliability.

In another possible design, the second base station determines, if a fifth data packet sent by a second terminal device is not received before a preset moment, that the fifth data packet is unsuccessfully sent. Whether the second terminal device successfully sends the data packet to the second base station is determined through a service cycle, to improve transmission reliability.

In another possible design, the second base station sends a sixth data packet to the core network device, where the sixth data packet includes at least one serial number, the serial number is carried in a header or a data payload of the sixth data packet, and the sixth data packet is for indicating that a data packet corresponding to the serial number is unsuccessfully sent. The header or the data payload is for indicating that the data packet is unsuccessfully sent, so that a next network node performs data transmission based on information indicated by the header or the data payload, to improve transmission reliability.

In another possible design, the second base station sends a sixth data packet to the core network device, where the sixth data packet includes fourth indication information, and the fourth indication information indicates that a previous data packet of the sixth data packet is unsuccessfully sent, a serial number of a data packet that is unsuccessfully sent before the sixth data packet, a quantity of data packets that are unsuccessfully sent accumulatively before the sixth data packet, or a quantity of data packets that are unsuccessfully sent consecutively before the sixth data packet.

According to a fourth aspect, at least one embodiment of this application provides a packet loss indication method. The method includes: A first base station determines that a core network device unsuccessfully sends a first data packet to the first base station, or that the first base station unsuccessfully sends a first data packet to a first terminal device. The first base station sends first indication information to the second base station. The first indication information indicates that the first data packet is unsuccessfully sent. If a transmission state of a data packet on a second link is obtained through a network node on a first link, the data packet may be transmitted in a high-reliability transmission manner based on the transmission state of the data packet on the second link if the data packet on the second link is unsuccessfully transmitted. In this way, different links are associated to improve reliability of network transmission In another possible design, a serial number of a data packet of the first base station corresponds to a serial number of a data packet of the second base station. The correspondence may be obtained from the core network device, or may be obtained from the second base station, or may be preset.

In another possible design, the first indication information may include an identifier of a data radio bearer corresponding to the first data packet or a serial number of the first data packet.

It should be noted that, the foregoing method is also applied to the second base station. If unsuccessfully sending data to UE, the second base station may also notify the first base station through the foregoing same method.

According to a fifth aspect, at least one embodiment of this application provides a communication apparatus. The communication apparatus is configured to implement the method and the functions performed by the core network device in the first aspect, and is implemented through hardware/software. The hardware/software thereof includes modules corresponding to the foregoing functions.

According to a sixth aspect, at least one embodiment of this application provides a communication apparatus. The communication apparatus is configured to implement the method and the functions performed by the first base station in the second aspect or the fourth aspect, and is implemented through hardware/software. The hardware/software thereof includes modules corresponding to the foregoing functions.

According to a seventh aspect, at least one embodiment of this application provides a communication apparatus. The communication apparatus is configured to implement the method and the functions performed by the second base station in the third aspect, and is implemented through hardware/software. The hardware/software thereof includes modules corresponding to the foregoing functions.

According to an eighth aspect, at least one embodiment of this application provides a communication apparatus. The communication apparatus is applied to a core network device, the communication apparatus may be the core network device or a chip in the core network device, and the communication apparatus includes: a processor, a memory, and a communication bus. The communication bus is configured to implement connection and communication between the processor and the memory, and the processor executes a program stored in the memory to implement the steps in the first aspect.

According to a ninth aspect, at least one embodiment of this application provides a communication apparatus. The communication apparatus is applied to a first base station, the communication apparatus may be the first base station or a chip in the first base station, and the communication apparatus includes: a processor, a memory, and a communication bus. The communication bus is configured to implement connection and communication between the processor and the memory, and the processor executes a program stored in the memory to implement the steps in the second aspect or the fourth aspect.

According to a tenth aspect, at least one embodiment of this application provides a communication apparatus. The communication apparatus is applied to a second base station, the communication apparatus may be the second base station or a chip in the second base station, and the communication apparatus includes: a processor, a memory, and a communication bus. The communication bus is configured to implement connection and communication between the processor and the memory, and the processor executes a program stored in the memory to implement the steps in the third aspect.

According to an eleventh aspect, this application provides a non-transitory computer-readable storage medium. The computer-readable storage medium stores instructions. When the instructions are run on a computer, the computer is enabled to perform the method in the foregoing aspects.

According to a twelfth aspect, this application provides a computer program product including instructions. When the instructions are run on a computer, the computer is enabled to perform the method in the foregoing aspects.

According to a thirteenth aspect, at least one embodiment of this application provides a chip. The chip includes a processor, and the processor is configured to invoke instructions stored in the memory from a memory and run the instructions, to enable a communication device in which the chip is installed to perform the method in any one of the foregoing aspects.

According to a fourteenth aspect, at least one embodiment of this application provides another chip. The chip includes: an input interface, an output interface, and a processor. Optionally, the chip further includes a memory. The input interface, the output interface, the processor, and the memory are connected through an internal connection path. The processor is configured to execute code in the memory. When the code is executed, the processor is configured to perform the method in any one of the foregoing aspects.

According to a fifteenth aspect, at least one embodiment of this application provides a communication system. The communication system includes at least one base station and at least one core network device. The base station is configured to perform the steps in the second aspect, the third aspect, or the fourth aspect. The core network device is configured to perform the steps in the first aspect.

BRIEF DESCRIPTION OF DRAWINGS

To describe the technical solutions in embodiments of this application or in the background more clearly, the following briefly describes the accompanying drawings for describing embodiments of this application or the background.

DESCRIPTION OF EMBODIMENTS

The following describes embodiments of this application with reference to the accompanying drawings in embodiments of this application.

Figure 1:
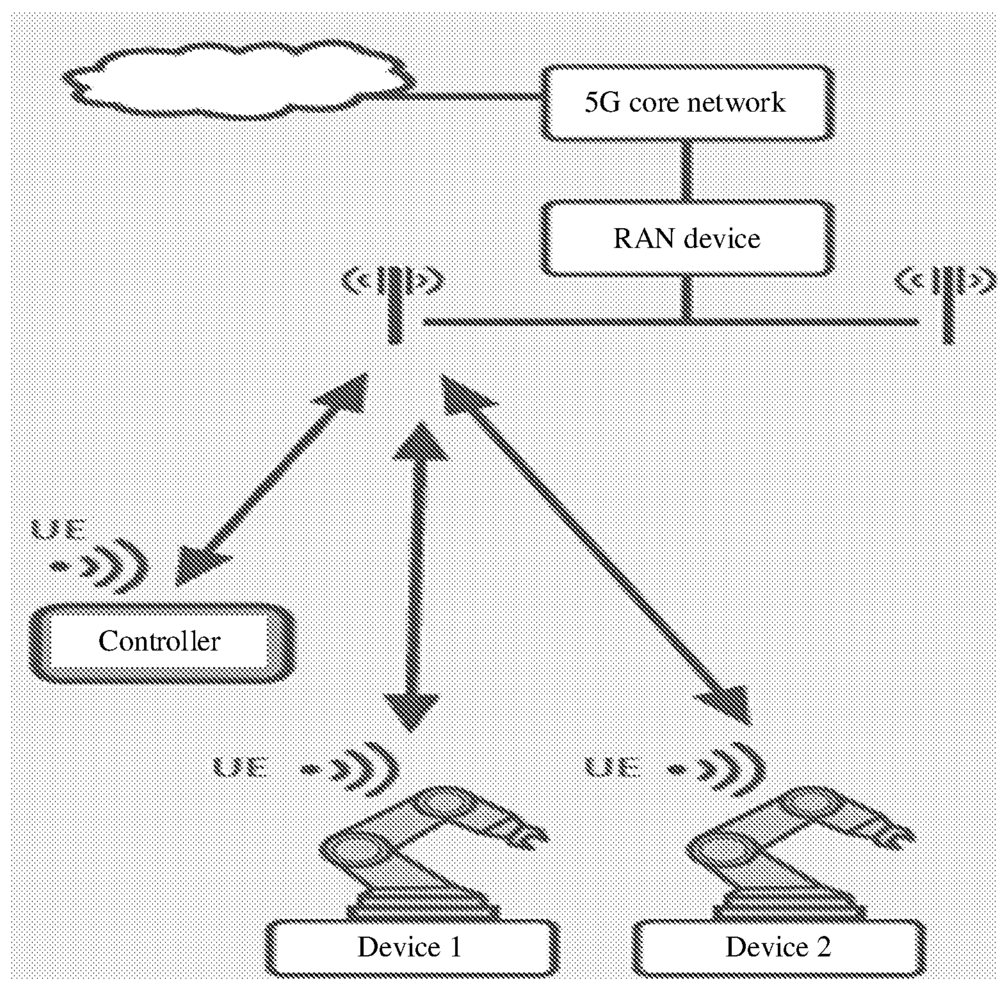
FIG. 1 is a schematic structural diagram of a communication system according to at least one embodiment of this application.

FIG. 1 is a schematic structural diagram of a communication system according to at least one embodiment of this application. The communication system includes a 5G core network, a radio access network (RAN) device, and a terminal device, and may further include a controller and a mechanical device. The 5G core network device may include an access and mobility management function (AMF) entity, a session management function (SMF) entity, a user plane function (UPF) entity, a policy control function (PCF) entity, and a unified data management (UDM) entity. The terminal device may include user equipment (UE), or may include a cellular phone, a smartphone, a portable computer, a handheld communication device, a handheld computing device, a satellite radio apparatus, a global positioning system, a personal digital assistant (PDA), and/or any other suitable device configured to perform communication in a wireless communication system, or the like. The RAN device may be an LTE and/or NR network device, and may be specifically a NodeB, an eNodeB, a base station in a 5G mobile communication system, a next generation Node B (gNB), a base station in a future mobile communication system, or an access node in a Wi-Fi system. The communication system may use a public land mobile network (PLMN), a device-to-device (D2D) network, a machine to machine (M2M) network, an internet of things (IoT), a narrow band (NB) network, a new radio (NR) network, machine type communications (MTC), or another network.

Figure 2:
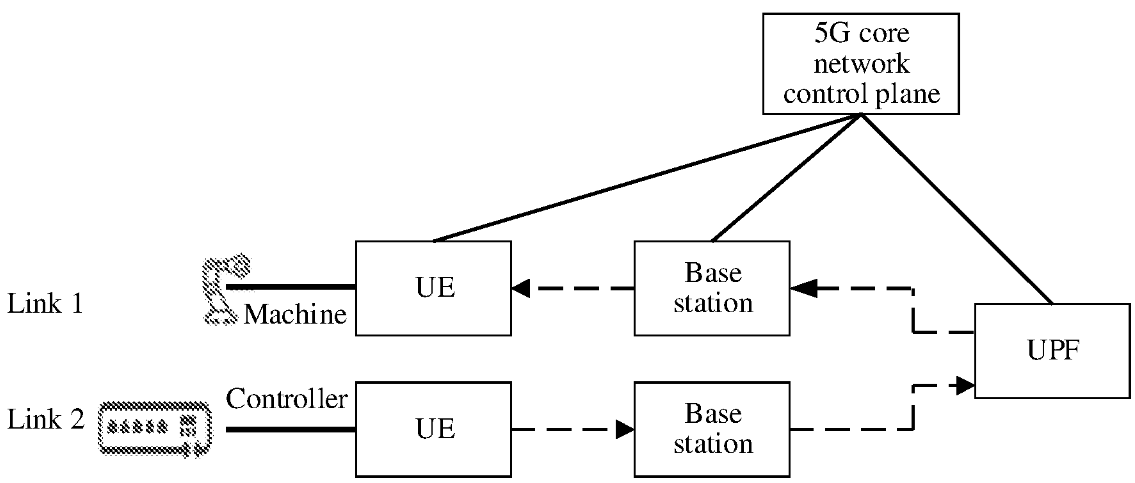
FIG. 2 is a schematic diagram of data packet transmission according to at least one embodiment of this application.

FIG. 2 is a schematic diagram of data packet transmission according to at least one embodiment of this application. A controller may be connected to a 5G core network through a wireless network, and transmission of a data packet involves two air interface transmissions (that is, two links). A first link is for transmitting the data packet from the controller to the 5G core network, and a second link is for transmitting the data packet from the 5G core network to a machine. If a data packet is lost on a link, the data packet is lost. Because transmission states of the two links are independent of each other, and one link cannot know whether a data packet on the other link is successfully transmitted, each network node cannot improve transmission reliability based on a transmission state. To resolve the foregoing technical problems, embodiments of this application provide the following solutions.

In embodiments of this application, a base station may also be understood as a cell, and a core network device may be an AMF entity, an SMF entity, a UPF entity, or the like. An example in which the core network device is the UPF entity is used for description.

Figures 3, 4:
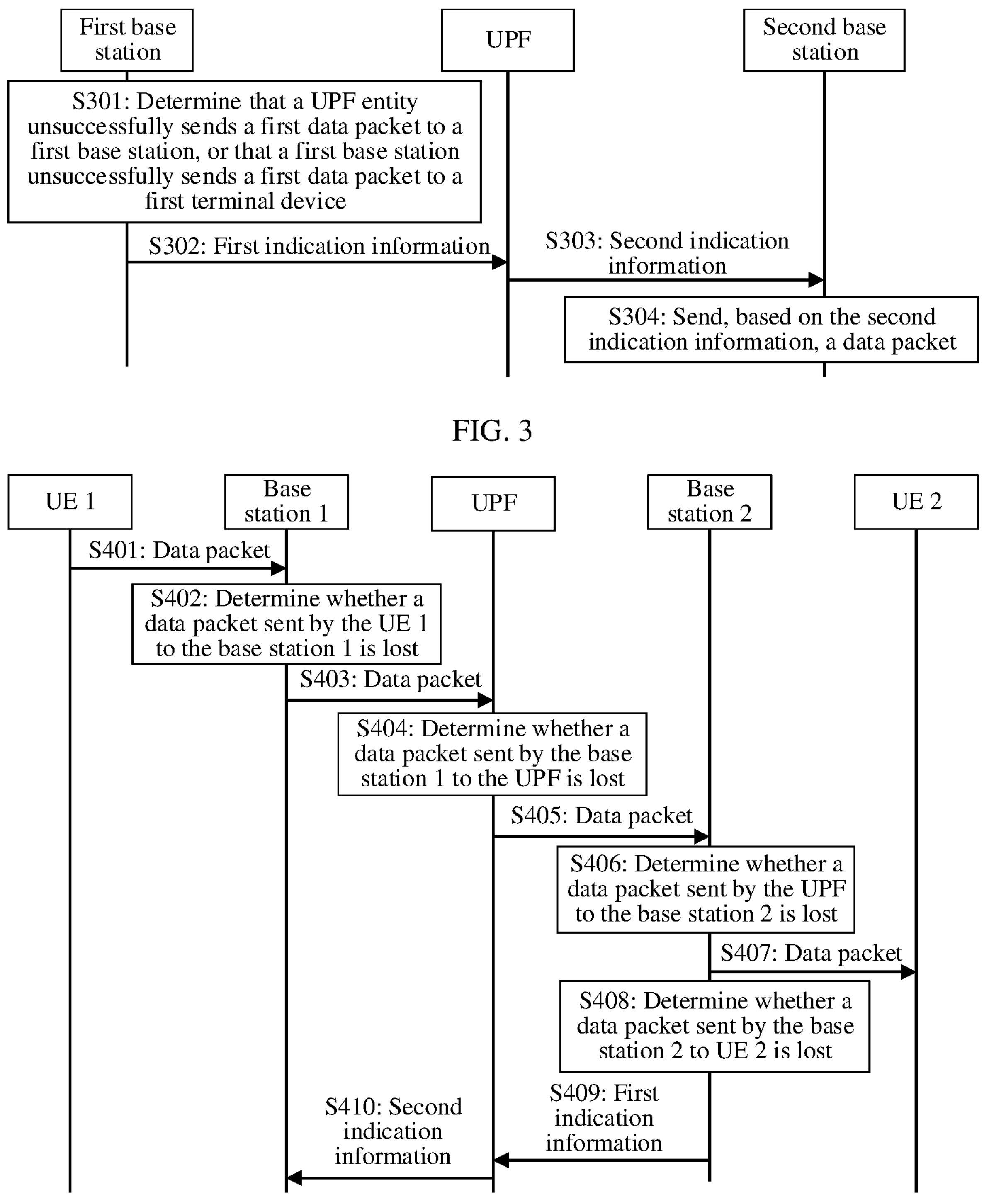
FIG. 3 is a schematic flowchart of a packet loss indication method according to at least one embodiment of this application.
FIG. 4 is a schematic flowchart of another packet loss indication method according to at least one embodiment of this application.

FIG. 3 is a schematic flowchart of a packet loss indication method according to at least one embodiment of this application. The method includes, but is not limited to, the following steps.

Before performing the following steps, the UPF entity may determine an association relationship between two links. The association relationship may be specifically that a PDU session of UE 1 between a first base station and the UPF entity corresponds to a PDU session of UE 2 between a second base station and the UPF entity. Alternatively, the association relationship may be that a first bearer of the UE 1 between the first base station and the UPF entity corresponds to a second bearer of the UE 2 between the second base station and the UPF entity. In addition, the association relationship may further include an association of a start serial number of a data packet. For example, GTP-U SN=1 of service transmission of the UE 1 between the first base station and the UPF entity corresponds to GTP-U SN=1 of service transmission of the UE 2 between the second base station and the UPF entity. In other words, the UPF entity needs to determine the association relationship between the two links. A data packet 1 received by the UPF entity from the first base station corresponds to a data packet 1 sent by the UPF entity to the second base station. The association relationship may be indicated by the SMF entity to the UPF entity, or may be indicated by the AMF entity to the UPF entity, or the like. In other words, indication information includes information of at least one of the two links that need to be associated, for example, a PDU session, a bearer identifier, an SN serial number, and UE information.

S301: A first base station determines that a UPF entity unsuccessfully sends a first data packet to the first base station, or that the first base station unsuccessfully sends a first data packet to a first terminal device.

Optionally, after the first base station sends the first data packet to the first terminal device, the first base station may receive a state report sent by the first terminal device, and determine, based on the state report, that the first base station unsuccessfully sends the first data packet to the first terminal device. The following several manners are included.

In a first optional manner, if packet loss occurs on a data packet received by the first terminal device (for example, a serial number of the received data packet is not consecutive), reporting of a state report to the first base station is triggered on a packet data convergence protocol (PDCP) layer of the first terminal device. Alternatively, after discontinuous data packets occur, a timer is started, and reporting of the state report is triggered after the timer reaches a preset time. The state report may include a serial number (SN) of a data packet currently received by the first terminal device, a serial number of a data packet that is not received by the first terminal device, or a serial number of a data packet that is recently received by the first terminal device. If the first base station determines that the serial number in the state report is not consecutive, or the serial number is not a serial number of a currently sent data packet or a serial number of a lost data packet, the first base station may determine that the first base station unsuccessfully sends the data packet to the first terminal device, and obtain a serial number of a data packet that is unsuccessfully sent. On the contrary, the first base station successfully sends the data packet to the first terminal device.

In a second optional manner, after receiving a PDCP protocol data unit (PDU), the first terminal device starts a timer, and if no data packet sent by the first base station is received within a service cycle or a preset moment, the first terminal device triggers sending of the state report to the first base station. The state report may include a serial number of a data packet currently received by the first terminal device. If the first base station determines that the serial number in the state report is not consecutive, or the serial number is not a serial number of a currently sent data packet, the first base station may determine that the first base station unsuccessfully sends the data packet to the first terminal device and obtain a serial number of a data packet that is unsuccessfully sent. On the contrary, the first base station successfully sends the data packet to the first terminal device.

In a third optional manner, the first base station may send a polling indication to the first terminal device, and after receiving the polling indication, the first terminal device sends the state report to the first base station. The state report includes an SN of a data packet recently successfully received by the first terminal device. If the first base station determines that the SN of the recently successfully received data packet in the state report is not a serial number of a currently sent data packet, or other serial number information, the first base station may determine that the first base station unsuccessfully sends the data packet to the first terminal device. On the contrary, the first base station successfully sends the data packet to the first terminal device.

In a fourth optional manner, the first terminal device triggers reporting of the state report when determining that a quantity of lost packets reaches a preset quantity. For example, the first terminal device may trigger reporting of the state report when N consecutive packets are lost, or may trigger reporting of the state report when N packets are lost accumulatively. In another example, a window may be set to M, and sending of the state report is triggered when N data packets are lost in the window M. M and N are integers greater than or equal to 1.

Optionally, the state report may further include a bearer (for example, a data radio bearer or another bearer) identifier and a serial number of a data packet corresponding to the bearer identifier.

Optionally, the first base station may receive a hybrid automatic repeat request (HARQ) feedback sent by the first terminal device, where the HARQ feedback is for determining that a radio access control MAC protocol data unit PDU is unsuccessfully sent; and the first base station determines, based on the MAC PDU, that the first base station unsuccessfully sends the first data packet to the first terminal device. The MAC PDU that is unsuccessfully sent is associated with a radio link control (RLC) PDU, that is, one MAC PDU may include a part or all of the RLC PDU, and the RLC PDU corresponds to a PDCP PDU. Therefore, an SN of a lost data packet PDCP PDU may be determined based on the MAC PDU that is unsuccessfully sent.

Optionally, the first base station may determine that the UPF entity unsuccessfully sends the first data packet to the first base station in the following several manners.

In a first optional manner, the first base station receives the first data packet sent by the UPF entity; the first base station determines whether serial numbers of received first data packets are consecutive; and if the serial numbers are not consecutive, the first base station determines that a previous data packet of the first data packet is unsuccessfully sent, that is, a data packet corresponding to a packet serial number that is not received is lost. Optionally, the first data packet may further include a bearer (for example, a data radio bearer or another bearer) identifier and a serial number of a data packet corresponding to the bearer identifier. If the serial numbers are consecutive, the first base station determines that the first data packet is successfully sent. For example, the UPF entity sends a data packet 1, a data packet 2, and a data packet 3 to the first base station. The first base station receives the data packet 1 and the data packet 3, but does not receive the data packet 2. Therefore, it may be determined that the data packet 2 is lost.

In a second optional manner, if the first base station does not receive the first data packet sent by the UPF entity before a preset moment or at a preset moment, the first base station determines that the first data packet is unsuccessfully sent. Even if subsequently receiving the first data packet, the first base station may also discard the first data packet. That is, the preset moment may be set based on a service cycle, a validity period, or an end-to-end sending time of a data packet, for example, a cycle time. When a base station does not receive a data packet within a preset period starting from a time point, the base station determines that the data packet is lost. The time point may be a time at which a packet is received for a first time, a moment at which a packet is sent, or the like. Alternatively, the data packet may carry a packet sending moment, and a receiving end determines, based on a validity period, whether the data packet is valid or whether the data packet is successfully sent.

S302: The UPF entity receives first indication information from a first base station, where the first indication information indicates that a first data packet is unsuccessfully sent, and that the first data packet is unsuccessfully sent includes that the UPF entity unsuccessfully sends the first data packet to the first base station or the first base station unsuccessfully sends the first data packet to a first terminal device.

Specifically, the first indication information received by the UPF entity from the first base station may specifically include a serial number of a data packet that is unsuccessfully sent, and the serial number may be a GTP-U SN serial number or a PDCP SN serial number. In other words, the first indication information may be GTP-U information, and a serial number included in the GTP-U information indicates the serial number of the data packet that is unsuccessfully sent. If a base station determines that a PDCP data packet is lost, the base station indicates a GTP-U SN serial number corresponding to the PDCP data packet to the UPF. The indication may be in a GTP-U extension header. The first indication information may be an empty data packet including only a header, or may be a data packet including a data payload.

Optionally, the first indication information may further include a bearer (for example, a data radio bearer or another bearer) identifier and a serial number of a data packet corresponding to the bearer identifier. The bearer identifier may also be a QoS flow identifier.

Optionally, the first indication information includes a serial number of at least one first data packet or a quantity of the first data packets, and the serial number of the data packet is for indicating that the first data packet is unsuccessfully sent. The first indication information may be a data packet or signaling. The data packet in this specification may also be understood as signaling.

Optionally, when the first indication information includes a serial number of only one first data packet, the first indication information may further include a quantity of consecutively or accumulatively lost data packets before the first data packet.

S303: The UPF entity sends second indication information to a second base station, where the second indication information indicates that the first data packet is unsuccessfully sent.

Optionally, the second indication information may further include an SN of the first data packet that is unsuccessfully sent.

Optionally, the second indication information is a serial number of a data packet sent by a corresponding second base station to the UPF, that is, a serial number of a data packet corresponding to the first data packet when the first data packet is transmitted between the second base station and the UPF entity. The second indication information may also be a serial number of transmission of the first data packet between the UPF and the first base station, or a serial number of transmission of the first data packet between the first base station and UE. The data packet herein refers to a data packet of a service, and does not include a header, a serial number, or the like of wireless transmission. Optionally, the second indication information may further include a bearer (for example, a data radio bearer or another bearer) identifier and a serial number of a data packet corresponding to the bearer identifier, and a serial number of a data packet indicating that the data packet is unsuccessfully transmitted in the bearer.

Optionally, the second indication information includes a packet serial number of at least one first data packet or a quantity of the first data packets, and the packet serial number of the data packet is for indicating that a data packet corresponding to the serial number is unsuccessfully sent. The second indication information may be a data packet or signaling. The data packet in this specification may also be understood as signaling.

Optionally, when the second indication information includes a serial number of only one first data packet, the second indication information may further include a quantity of consecutively or accumulatively lost data packets before the serial number of the first data packet, or a quantity of consecutively or accumulatively lost data packets including the first data packet. A first data packet corresponding to the serial number is also in an unsuccessfully-sending state.

Optionally, the second indication information may be the same as or different from the first indication information. If the second indication information is different from the first indication information, a packet serial number carried in the second indication information should be a packet serial number of a corresponding data packet when a data payload of the first data packet is directly transmitted between the second base station and the UPF.

Optionally, the second indication information may be indicated through a header of an empty data packet, or may be indicated through a data payload part of a data packet, or may be indicated through signaling between the UPF and the base station.

S304: The second base station sends, based on the second indication information, the data packet to the UPF.

Specifically, after receiving the second indication information, the second base station may determine that the UPF entity unsuccessfully sends the first data packet to the first base station, or the first base station unsuccessfully sends the first data packet to the first terminal device. Therefore, the second base station may resend, based on an SN of the first data packet, the first data packet to the UPF. Alternatively, the second base station sends a next data packet in a high-reliability transmission manner, for example, by repeatedly sending a data packet or reducing a bit error rate.

Alternatively, the second base station may communicate with UE based on the second indication information.

Specifically, after receiving the second indication information, the second base station may determine that the UPF entity unsuccessfully sends the first data packet to the first base station, or the first base station unsuccessfully sends the first data packet to the first terminal device. When receiving a next data packet of the UE, the second base station uses a high-reliability transmission manner, for example, PDCP duplication, so that data may be successfully transmitted, and the data packet is sent to the UPF.

In embodiments of this application, if a transmission state of a data packet on a second link is obtained through a network node on a first link, the data packet may be transmitted in a high-reliability transmission manner based on the transmission state of the data packet on the second link if the data packet on the second link is unsuccessfully transmitted. In this way, different links are associated to improve reliability of network transmission.

FIG. 4 is a schematic flowchart of a packet loss indication method according to at least one embodiment of this application. The method includes, but is not limited to, the following steps.

S401: UE 1 sends a data packet to a base station 1.

S402: The base station 1 determines whether the UE 1 unsuccessfully sends the data packet to the base station 1.

Optionally, the base station 1 determines whether serial numbers of received data packets are consecutive. If the serial numbers are not consecutive, the base station 1 determines that the UE 1 unsuccessfully sends the data packet to the base station 1. If the serial numbers are consecutive, the base station 1 determines that the UE 1 successfully sends the data packets to the base station 1. For example, the UE 1 sends a data packet 1, a data packet 2, and a data packet 3 to the base station 1. The base station 1 receives the data packet 1 and the data packet 3, but does not receive the data packet 2. Therefore, it may be determined that the data packet 2 is lost. If the base station 1 receives the data packet 1, the data packet 2, and the data packet 3, it is determined that the UE 1 successfully sends the data packets to the base station 1.

Optionally, if the base station 1 does not receive the data packet sent by the UE 1 before a preset moment, the base station 1 determines that the UE 1 unsuccessfully sends the data packet to the base station 1. Even if the base station 1 subsequently receives the data packet, the base station 1 may also discard the data packet. If the base station 1 receives the data packet sent by the UE 1 before the preset moment, the base station 1 determines that the UE 1 successfully sends the data packet to the base station 1.

S403: The base station 1 sends a data packet to a UPF entity.

The data packet sent by the base station 1 to the UPF entity is the same as the data packet sent by the UE 1 to the base station 1. The base station 1 may send, through a GTP-U, the data packet received from the UE to the UPF entity.

If a packet loss occurs when the UE 1 sends the data packet to the base station 1, when the base station 1 transmits the data packet to the UPF, it may be considered that the lost packet occupies one serial number. In other words, when the base station 1 sends a next data packet, a corresponding GTP-U SN serial number may be directly increased by 1. In this way, the UPF may determine, based on continuity of a serial number of the data packet, whether a packet loss occurs.

S404: The UPF entity determines whether the base station 1 unsuccessfully sends the data packet to the UPF entity.

Optionally, the UPF entity determines whether serial numbers of received data packets are consecutive. If the serial numbers are not consecutive, the UPF entity determines that the base station 1 unsuccessfully sends the data packet to the UPF entity. If the serial numbers are consecutive, the UPF entity determines that the base station 1 successfully sends the data packet to the UPF entity. For example, the base station 1 sends a data packet 1, a data packet 2, and a data packet 3 to the UPF entity. The UPF entity receives the data packet 1 and the data packet 3, but does not receive the data packet 2. Therefore, it may be determined that the data packet 2 is lost. If the UPF entity receives the data packet 1, the data packet 2, and the data packet 3, it is determined that the base station 1 successfully sends the data packet to the UPF entity.

Optionally, if the UPF entity does not receive the data packet sent by the base station 1 before or within a preset moment, the UPF entity determines that the data packet is unsuccessfully sent. Even if the UPF entity subsequently receives the data packet, the UPF entity may also discard the data packet. If the UPF entity receives the data packet sent by the base station 1 before the preset moment, the UPF entity determines that the data packet is successfully sent.

Optionally, if determining that the base station 1 unsuccessfully sends the data packet, the UPF entity sends indication information to a base station 2, and the indication information indicates that the data packet is unsuccessfully sent. The indication information may be an empty data packet, and a header includes a serial number, indicating that the data packet is lost. Alternatively, when the UPF entity sends a next data packet, a serial number is increased by 1, indicating that a data packet before the next data packet is lost. After receiving the data packet, the base station 2 determines that a serial number of the received data packet is not consecutive, and may determine that the data packet is lost. Alternatively, the UPF entity does not perform any processing, and the base station 2 determines, based on a data packet sending cycle, that the data packet is lost. Optionally, the indication information may further include a bearer (for example, a data radio bearer or another bearer) identifier and a serial number of a data packet corresponding to the bearer identifier, to indicate that a data packet in the bearer is lost.

S405: The UPF entity sends a data packet to a base station 2.

The data packet sent by the UPF entity to the base station 2 may be the same as the data packet sent by the base station 1 to the UPF entity.

Data sent by the UPF entity to the base station 2 may be sent by the base station 1 to the UPF. After receiving the data, the UPF processes the data, and sends the processed data to the UE through the base station 1. Therefore, it may be considered that a same data packet is transmitted.

If a packet loss occurs when the UE 1 sends the data packet to the base station 1 or a packet loss occurs when the base station 1 sends the data packet to the UPF, it may be considered that the lost packet occupies one serial number. In other words, when the UPF sends a next data packet to the base station 2, a corresponding GTP-U SN serial number may be directly increased by 1. In this way, the base station 2 may determine, based on continuity of a serial number of the data packet, whether a packet loss occurs. If this manner is not used, the base station 2 may determine, based on a service cycle in which a packet or a data packet arrives at a preset moment, whether the packet loss occurs.

S406: The base station 2 determines whether the UPF entity unsuccessfully sends the data packet to the base station 2.

A specific implementation is the same as that in step S404, and details are not described again in this step.

If the UPF entity unsuccessfully sends the data packet to the base station 2, the base station 2 sends, to the UPF entity, an indication indicating that the data packet is unsuccessfully sent. Specifically, a serial number of the data packet that is unsuccessfully sent may be indicated. In addition, a high-reliability manner is used in subsequent data transmission with the UE.

S407: The base station 2 sends a data packet to UE 2.

If the base station 2 determines that a previously transmitted data packet is lost, high reliability needs to be ensured during transmission with the UE 2, for example, through PDCP duplication, repetition, and encoding method adjustment.

S408: The base station 2 determines whether the base station 2 unsuccessfully sends the data packet to the UE 2.

A specific implementation is the same as that in S301 in which the first base station determines whether the first base station successfully sends the first data packet to the first terminal device in at least one of the foregoing embodiments. Details are not described in this step again.

S409: The base station 2 sends first indication information to the UPF entity, where the first indication information indicates that the UPF entity unsuccessfully sends the data packet to the base station 2 or the base station 2 unsuccessfully sends the data packet to the UE 2.

Specifically, a first indication manner may include a serial number of a data packet transmitted by a corresponding UPF entity to the base station 2, that is, a data packet corresponding to the serial number is lost. For example, the UPF entity sends a data packet 3, a data packet 4, and a data packet 5 to the base station 2, and serial numbers of the data packet 3, the data packet 4, and the data packet 5 are GTP-U SN serial numbers. Correspondingly, after receiving the data packet 3, the data packet 4, and the data packet 5, the base station 2 sends PDCP data packets 5, 6, and 7 to the UE. If the data packet 6 sent by the base station 2 to the UE is lost, the base station 2 indicates, to the UPF entity, that a data packet GTP-U SN serial number 4 is lost.

The first indication information may include a serial number of a corresponding data packet when the lost data packet is sent by the UPF entity to the base station 2, for example, a GTP-U SN.

The first indication information includes a serial number of at least one data packet or a quantity of lost data packets, and the serial number of the data packet is for indicating that a data packet corresponding to the serial number is unsuccessfully sent. The first indication information may be a data packet or signaling. The data packet in this specification may also be understood as signaling.

When the first indication information includes a serial number of only one data packet, the first indication information may further include a quantity of consecutively or accumulatively lost data packets before the data packet.

Optionally, the first indication information may further include a bearer (for example, a data radio bearer or another bearer) identifier and a serial number of a data packet corresponding to the bearer identifier, to indicate that a data packet in the bearer is lost.

S410: The UPF entity sends second indication information to the base station 1, where the second indication information indicates that the UPF entity unsuccessfully sends the data packet to the base station 2 or the base station 2 unsuccessfully sends the data packet to UE 2. Optionally, the second indication information may further include an SN of the data packet that is unsuccessfully sent.

Specifically, the second indication information includes a serial number of a data packet sent by a corresponding UPF entity to the base station 2, that is, a data packet corresponding to the serial number is lost. For example, the base station 1 sends a data packet 1, a data packet 2, and a data packet 3 to the UPF. After the UPF entity receives the data packet 1, the data packet 2, and the data packet 3, correspondingly, the UPF entity sends the data packet 3, a data packet 4, and a data packet 5 to the base station 2. Serial numbers of the data packet 3, the data packet 4, and the data packet 5 are GTP-U SN serial numbers. Correspondingly, after receiving the data packet 3, the data packet 4, and the data packet 5, the base station 2 sends PDCP data packets 5, 6, and 7 to the UE. If the data packet 6 sent by the base station 2 to the UE is lost, the base station 2 indicates, to the UPF entity, that a data packet GTP-U SN serial number 4 is lost, and the UPF entity indicates, to the base station 1, that the data packet 2 (GTP-U SN) is unsuccessfully sent.

The second indication information may include a corresponding packet serial number when the lost data packet is sent by the base station 1 to the UPF, for example, a GTP-U SN. The second indication information may also be the same as that in at least one of the foregoing embodiments.

Optionally, the second indication information may further include a bearer (for example, a data radio bearer or another bearer) identifier and a serial number of a data packet corresponding to the bearer identifier, to indicate that a data packet in the bearer is lost.

Optionally, after receiving the second indication information, the base station 1 may determine that the UPF entity unsuccessfully sends the data packet to the base station 2, or the base station 2 unsuccessfully sends the data packet to the UE 2. Therefore, the base station 1 may, based on an SN of the data packet that is unsuccessfully sent, resend the data packet to the UPF entity, or send a subsequent data packet in a high-reliability transmission manner, for example, by repeatedly sending the data packet or reducing a bit error rate.

Optionally, the base station 1 and the base station 2 may obtain survival time information from a core network device. If a quantity of lost data packets exceeds a quantity of data packets corresponding to the survival time information, it is determined that the data packet is unsuccessfully transmitted.

In embodiments of this application, if a transmission state of a data packet on a second link is obtained through a network node on a first link, the data packet may be transmitted in a high-reliability transmission manner based on the transmission state of the data packet on the second link if the data packet on the second link is unsuccessfully transmitted. In this way, different links are associated to improve reliability of network transmission.

Figure 5:
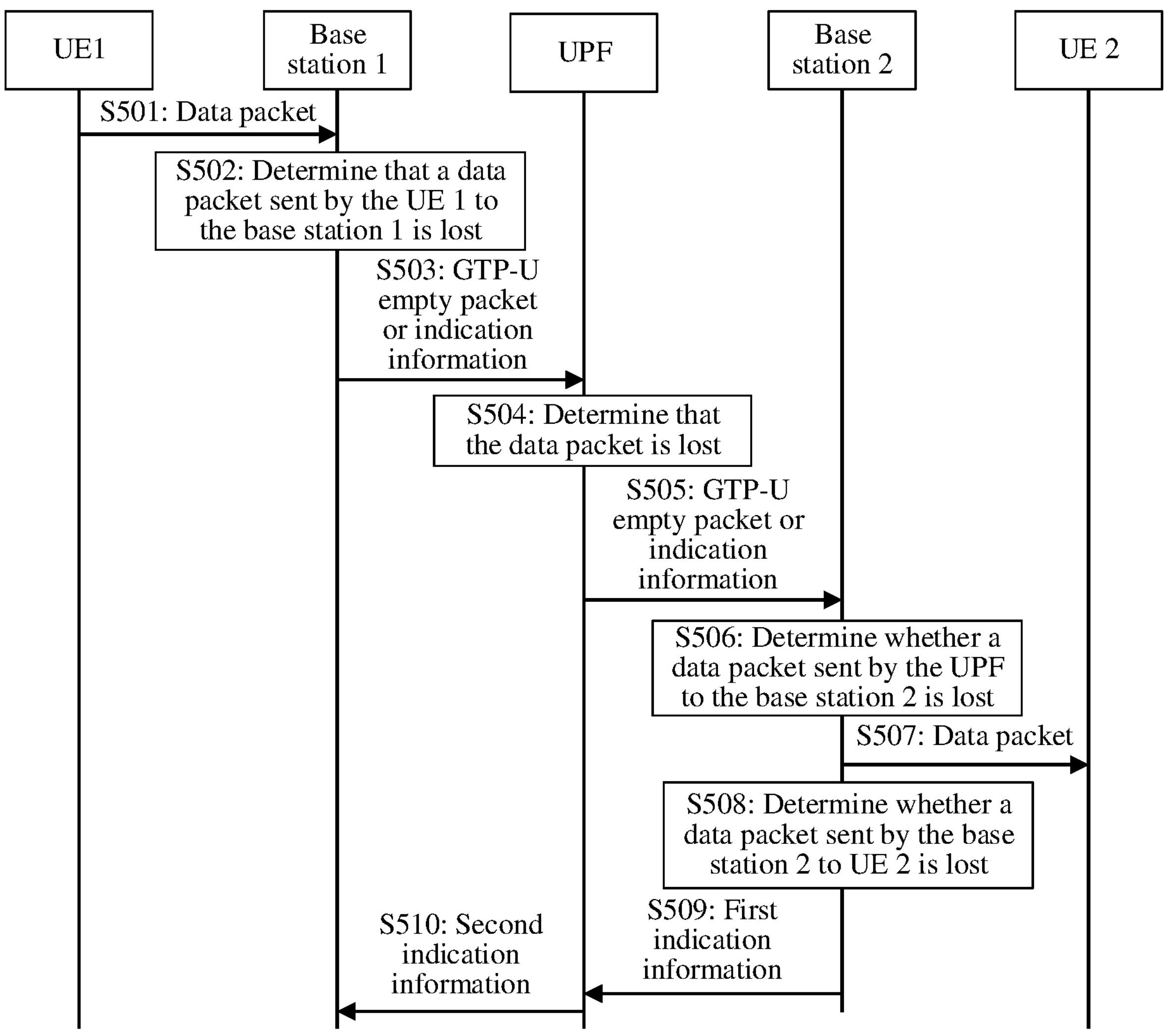
FIG. 5 is a schematic flowchart of another packet loss indication method according to at least one embodiment of this application.

FIG. 5 is a schematic flowchart of a packet loss indication method according to at least one embodiment of this application. The method includes, but is not limited to, the following steps.

S501: UE 1 sends a data packet to a base station 1.

S502: The base station 1 determines whether the UE 1 unsuccessfully sends the data packet to the base station 1.

Optionally, the base station 1 determines whether serial numbers of received data packets are consecutive. If the serial numbers are not consecutive, the base station 1 determines that the UE 1 unsuccessfully sends the data packet to the base station 1. If the serial numbers are consecutive, the base station 1 determines that the UE 1 successfully sends the data packets to the base station 1. For example, the UE 1 sends a data packet 1, a data packet 2, and a data packet 3 to the base station 1. The base station 1 receives the data packet 1 and the data packet 3, but does not receive the data packet 2. Therefore, it may be determined that the data packet 2 is lost. If the base station 1 receives the data packet 1, the data packet 2, and the data packet 3, it is determined that the UE 1 successfully sends the data packets to the base station 1.

Optionally, if the base station 1 does not receive the data packet sent by the UE 1 before a preset moment, the base station 1 determines that the data packet is unsuccessfully sent. Even if the base station 1 subsequently receives the data packet, the base station 1 may also discard the data packet. If the base station 1 receives the data packet sent by the UE 1 before the preset moment, the base station 1 determines that the data packet is successfully sent.

S503: If the base station 1 determines that the data packet sent by the UE 1 to the base station 1 is lost, the base station 1 sends a GPRS tunnelling protocol user (GTP-U) empty packet to a UPF entity, where the GTP-U empty packet includes only a header, the header includes a serial number, and the GTP-U empty packet is for indicating that a data packet corresponding to the serial number is unsuccessfully sent.

Figure 6:
FIG. 6 is a schematic diagram of a packet loss indication method according to at least one embodiment of this application.
Figure 6:
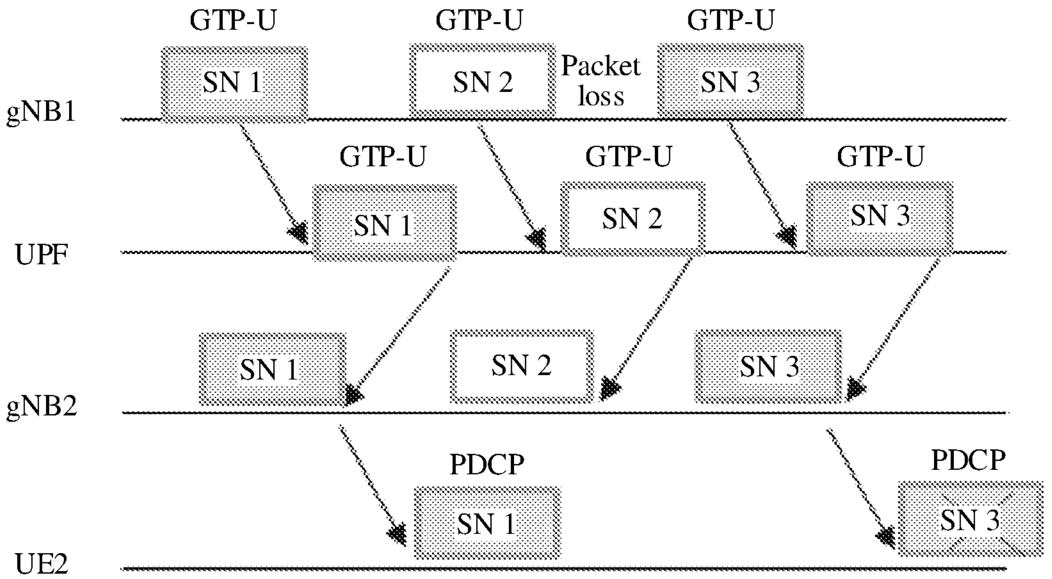

As shown in FIG. 6, when a data packet whose PDCP SN is 2 is lost, when the base station 1 sends data to the UPF entity, only one GTP-U empty packet is sent, but the serial number is normally increased. For example, if a serial number of a previous data packet received by the base station 1 is 1, a serial number of a lost data packet is 2, the base station 1 may send the GTP-U empty packet to the UPF entity, and the GTP-U empty packet indicates that a data packet of a GTP-U SN serial number corresponding to a serial number 2 is lost.

Optionally, if the base station 1 determines that the data packet 1 sent by the UE 1 to the base station 1 is lost, the base station 1 may send the data packet 2 to the UPF entity, where the data packet 2 is a next data packet of the data packet 1, the data packet 2 includes third indication information, and the third indication information indicates that the previous data packet 1 of the data packet 2 is unsuccessfully sent. The third indication information may include a serial number of the data packet 1.

Optionally, data of a plurality of types of data radio bearers (DRB) may be transmitted in one GTP-U tunnel. Therefore, a DRB serial number, or an identifier of a data radio bearer, or another identifier may be carried when the DRB is transmitted, to indicate a current service bearer, and further indicate a serial number of a lost data packet corresponding to a DRB.

In other words, a packet loss indication sent by the base station 1 to the UPF entity may include a bearer identifier and a serial number of a data packet corresponding to the bearer identifier. The bearer may be a data radio bearer or another bearer, for example, a QoS flow or a wired bearer.

If the base station 1 determines that the data packet sent by the UE 1 to the base station 1 is lost, the base station 1 sends the third indication information to the UPF entity.

The third indication information includes a packet serial number of at least one data packet or a quantity of lost data packets, and the packet serial number of the data packet is for indicating that a data packet corresponding to the serial number is unsuccessfully sent. The third indication information may be a data packet or signaling. The data packet in this specification may also be understood as signaling.

When the third indication information includes a serial number of only one data packet, the third indication information may further include a quantity of consecutively or accumulatively lost data packets before the data packet.

Optionally, after determining that the data packet sent by the UE 1 to the base station 1 is lost, the base station 1 may send another data packet to the UPF entity in a high-reliability transmission manner.

S504: After receiving the GTP-U empty packet or the third indication information sent by the base station 1, the UPF entity may determine that the UE 1 unsuccessfully sends the data packet to the base station 1. Therefore, the UPF entity transmits packet loss information to a base station 2 in a same manner as that for the base station 1.

For example, the UPF entity may send a GTP-U empty packet to the base station 2, where the GTP-U empty packet includes only a header, the header includes a serial number, and the GTP-U empty packet is for indicating that a data packet corresponding to the serial number is unsuccessfully sent. Alternatively, when the UPF entity sends a next data packet of a lost data packet to the base station 2, fourth indication information is carried, and the fourth indication information indicates a serial number of the lost data packet.

Optionally, the fourth indication information may further include a bearer (for example, a data radio bearer or another bearer) identifier and a serial number of a data packet corresponding to the bearer identifier, to indicate that a data packet in the bearer is lost.

Optionally, the fourth indication information includes at least one packet serial number of the data packet or a quantity of lost data packets, and the packet serial number of the data packet is for indicating that a data packet corresponding to the serial number is unsuccessfully sent. The fourth indication information may be a data packet or signaling. The data packet in this specification may also be understood as signaling. A serial number of at least one data packet may be carried in a header or a data payload. When the fourth indication information is the signaling, it may be understood that the data payload is content carried in the signaling.

Optionally, when the fourth indication information includes a serial number of only one data packet, the fourth indication information may further include a quantity of consecutively or accumulatively lost data packets before the data packet.

In this application, if a data packet is not received within a timeout period, it may be considered that the data packet is lost. If the data packet is subsequently received, the data packet may be directly discarded, or may be normally transmitted, which is processed by an application layer.

Optionally, after receiving the GTP-U empty packet or the third indication information, the UPF entity may send another data packet to the UPF entity in a high-reliability transmission manner.

Optionally, the UPF entity determines whether serial numbers of data packets sent by the base station 1 are consecutive. If the serial numbers are not consecutive, the UPF entity determines that the base station 1 unsuccessfully sends the data packets to the UPF entity. If the serial numbers are consecutive, the UPF entity determines that the base station 1 successfully sends the data packets to the UPF entity. For example, the base station 1 sends a data packet 1, a data packet 2, and a data packet 3 to the UPF entity. The UPF entity receives the data packet 1 and the data packet 3, but does not receive the data packet 2. Therefore, it may be determined that the data packet 2 is lost. If the UPF entity receives the data packet 1, the data packet 2, and the data packet 3, it is determined that the base station 1 successfully sends the data packets to the UPF entity.

Optionally, if the UPF entity does not receive the data packet sent by the base station 1 before a preset moment, the UPF entity determines that the data packet is unsuccessfully sent. Even if the UPF entity subsequently receives the data packet, the UPF entity may also discard the data packet. If the UPF entity receives the data packet sent by the base station 1 before the preset moment, the UPF entity determines that the data packet is successfully sent.

S506: The base station 2 determines whether the UPF entity unsuccessfully sends the data packet to the base station 2.

A specific implementation is the same as a manner in which the base station 1 determines whether the UE 1 unsuccessfully sends the data packet to the base station 1, and details are not described in this step again.

S507: The base station 2 sends a data packet to UE 2.

S508: The base station 2 determines whether the base station 2 unsuccessfully sends the data packet to the UE 2.

A specific implementation is the same as an implementation of S408 in at least one of the foregoing embodiments. Details are not described in this step again.

S509: The base station 2 sends first indication information to the UPF entity, where the first indication information indicates that the UPF entity unsuccessfully sends the data packet to the base station 2 or the base station 2 unsuccessfully sends the data packet to the UE 2.

S510: The UPF entity sends second indication information to the base station 1, where the second indication information indicates that the UPF entity unsuccessfully sends the data packet to the base station 2 or the base station 2 unsuccessfully sends the data packet to UE 2. Optionally, the second indication information may further include an SN of the data packet that is unsuccessfully sent.

Optionally, after receiving the second indication information, the base station 1 may determine that the UPF entity unsuccessfully sends the data packet to the base station 2, or the base station 2 unsuccessfully sends the data packet to the UE 2. Therefore, the base station 1 may, based on an SN of the data packet that is unsuccessfully sent, resend the data packet to the UPF entity, or send a subsequent data packet in a high-reliability transmission manner, for example, by repeatedly sending the data packet or reducing a bit error rate.

Optionally, the base station 1 and the base station 2 may obtain survival time information from a core network device. If a quantity of lost data packets exceeds a quantity of data packets corresponding to the survival time information, it is determined that the data packet is unsuccessfully transmitted.

In at least one embodiment of this application, if a transmission state of a data packet on a second link is obtained through a network node on a first link, the data packet may be transmitted in a high-reliability transmission manner based on the transmission state of the data packet on the second link if the data packet on the second link is unsuccessfully transmitted. In this way, different links are associated to improve reliability of network transmission.

In at least another embodiment, there is an association between a serial number of a data packet in a bearer transmitted between the base station 1 and the UE 1 and a serial number of a data packet in a bearer transmitted between the base station 2 and the UE 2. After the first data packet is unsuccessfully transmitted, the base station 2 may directly send first indication information, or a first data packet to the base station 1 through an Xn interface or an X2 interface between the base stations. The first indication information may be used for indicating that the first data packet is unsuccessfully sent. The first indication information may include an identifier of a data radio bearer corresponding to the first data packet and a serial number of the first data packet, and the serial number may be a PDCP SN or a GTP-U SN. For example, the UE 1 sends a data packet 1, a data packet 2, and a data packet 3 to the base station 1, and the data packets are PDCP data packet serial numbers in a DRB 1 bearer. Then, the base station 1 sends the data packet 1, the data packet 2, and the data packet 3 to the UPF entity. After receiving the data packet 1, the data packet 2, and the data packet 3, the UPF entity sends the data packet 3, a data packet 4, and the data packet 5 to the base station 2, where the data packets 3, 4, and 5 are GTP-U SN serial numbers. Correspondingly, after receiving the data packet 3, the data packet 4, and the data packet 5, the base station 2 sends PDCP data packets 5, 6, and 7 to the UE. If the data packet 6 sent by the base station 2 to the UE is lost, the base station 2 sends the first indication information to the base station 1, and the first indication information includes that a data packet whose data packet PDCP SN is 6 in the DRB 1 is lost. Therefore, the base station 1 determines that a data packet PDCP SN2 in the DRB 1 is unsuccessfully sent, and performs high-reliability transmission in subsequent transmission as possible.

Similarly, if the base station 1 unsuccessfully sends the data packet, the base station 2 may also be notified in this manner.

An association relationship between data transmission of the base station 1 and data transmission of the base station 2 may be preconfigured. For example, an identifier of a data radio bearer and a serial number of start data of a corresponding data radio bearer may be configured. When the serial number is reversed or reset, the serial number also needs to be synchronized to the base station 1 or 2 in time, that is, reversal information is sent, for example, the serial number is 0. Alternatively, a correspondence between serial numbers is configured. For example, the core network device notifies the base station 1 that a data packet serial number of a specific service or bearer of UE corresponds to a data packet serial number of a bearer of UE of the base station 2, and an uplink or downlink information indication. The serial number may be a PDCP SN serial number or a GTP-U SN serial number. Specifically, the core network device sends to the base station 1 that a data packet serial number of the UE 2 in a first bearer of the base station 2 corresponds to a data packet serial number of the UE 1 in a second bearer of the base station 1, and may also indicate an uplink-downlink relationship.

For example, a core network notifies a base station that a data packet serial number 1 of an uplink bearer 1 of UE 1 corresponds to a data packet 1 of a downlink bearer 2 of UE 2. When determining that a data packet is lost, the base station 1 may directly send a bearer identifier of the lost data packet, for example, a radio bearer identifier and a serial number, to the base station 2 through an X2 interface, an Xn interface, or an interface between other base stations. That is, the base station 1 and the base station 2 may obtain a correspondence of data packet transmission between two UEs on two links, and a serial number 1 of a data packet of an uplink first bearer of first UE of the base station 1 corresponds to a serial number 2 of a data packet of a downlink second bearer of second UE of the base station 2. When a data packet is unsuccessfully transmitted, transmission indication may be performed through an interface between base stations, or may be indicated through the core network. Indication information used for indicating a packet loss transmitted between the base station 1 and the base station 2 (the base station 2 sends to the base station 1 or the base station 1 sends to the base station 2) may include a packet serial number of at least one data packet or a quantity of lost data packets, and the packet serial number of the data packet is for indicating that a data packet corresponding to the serial number is unsuccessfully sent. The indication information may be a data packet or signaling. If the indication information includes a packet serial number of only one data packet, the indication information may further include a quantity of consecutively or accumulatively lost data packets before the packet serial number.

Alternatively, packet loss indication information in embodiments of this application may not indicate a specific serial number of a lost packet, but only indicate a packet loss, so that a base station performs high-reliability transmission after receiving the information.

The methods in embodiments of this application are described above in detail, and apparatuses in embodiments of this application are provided below.

Figure 7:
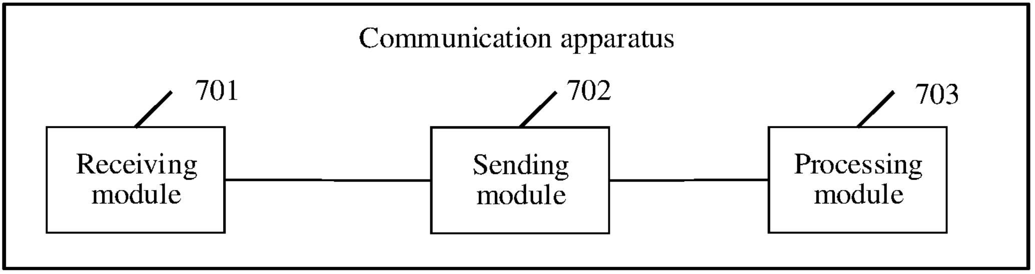
FIG. 7 is a schematic structural diagram of a communication apparatus according to at least one embodiment of this application.

FIG. 7 is a schematic structural diagram of a communication apparatus according to at least one embodiment of this application. The communication apparatus may be a core network device, or a chip or a processing system in the core network device. The apparatus may be configured to implement any method and function related to the terminal device in any one of the foregoing embodiments. The apparatus may include a receiving module 701, a sending module 702, and a processing module 703. Optionally, the receiving module 701 and the sending module 702 correspond to a radio frequency circuit and a baseband circuit that are included in the core network device. The modules are described in detail as follows.

The receiving module 701 is configured to receive first indication information from a first base station, where the first indication information indicates that a first data packet is unsuccessfully sent, and that the first data packet is unsuccessfully sent includes that a core network device unsuccessfully sends the first data packet to the first base station or the first base station unsuccessfully sends the first data packet to a first terminal device.

The sending module 702 is configured to send second indication information to a second base station, where the second indication information indicates that the first data packet is unsuccessfully sent.

Optionally, the second indication information includes one or more of the following: a serial number of the at least one first data packet, a bearer identifier corresponding to the first data packet, a quantity of the at least one first data packet, and a quantity of consecutively or accumulatively lost data packets before the first data packet.

Optionally, the first indication information includes one or more of the following: a serial number of the at least one first data packet, a bearer identifier corresponding to the first data packet, a quantity of the at least one first data packet, and a quantity of consecutively or accumulatively lost data packets before the first data packet.

Optionally, the receiving module 701 is further configured to receive a second data packet from the second base station.

The processing module 703 is configured to: determine whether a serial number of the received second data packet is consecutive; and if the serial number is not consecutive, determine that a previous data packet of the second data packet is unsuccessfully sent.

Optionally, the sending module 702 is further configured to send third indication information to the first base station, where the third indication information indicates that the second base station unsuccessfully sends a fourth data packet to the core network device or a second terminal device unsuccessfully sends a fourth data packet to the second base station.

Optionally, the third indication information includes one or more of the following: a serial number of the at least one fourth data packet, a bearer identifier corresponding to the fourth data packet, a quantity of the at least one fourth data packet, and a quantity of consecutively or accumulatively lost data packets before the fourth data packet.

Optionally, the processing module 703 is configured to determine, if a second data packet sent by the second base station is not received before a preset moment, that the second data packet is unsuccessfully sent.

Optionally, the sending module 702 is further configured to send a third data packet to the first base station, where the third data packet includes at least one serial number, the serial number is carried in a header or a data payload of the third data packet, and the third data packet is for indicating that a data packet corresponding to the serial number is unsuccessfully sent.

Optionally, the sending module 702 is further configured to send a third data packet to the first base station, where the third data packet includes fourth indication information, and the fourth indication information indicates that a previous data packet of the third data packet is unsuccessfully sent, a serial number of a data packet that is unsuccessfully sent before the third data packet, a quantity of data packets that are unsuccessfully sent accumulatively before the third data packet, or a quantity of data packets that are unsuccessfully sent consecutively before the third data packet.

It should be noted that, implementation of each module may further be correspondingly referred to corresponding descriptions in the method embodiments shown in FIG. 3 to FIG. 5, and the method and the functions performed by the core network device in the foregoing embodiments are performed.

Figure 8:
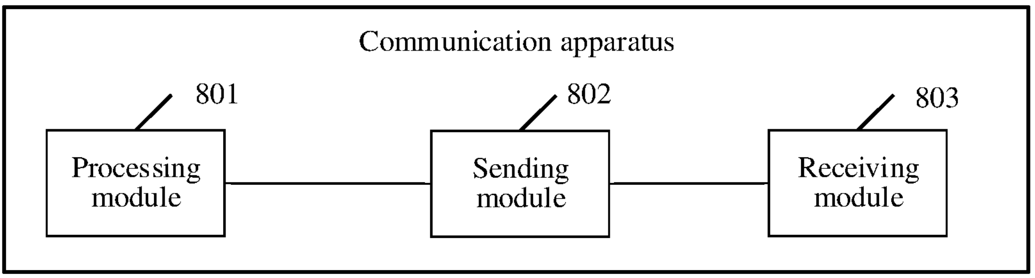
FIG. 8 is a schematic structural diagram of another communication apparatus according to at least one embodiment of this application.

FIG. 8 is a schematic structural diagram of a communication apparatus according to at least one embodiment of this application. The communication apparatus may be a first base station, or a chip or a processing system in the first base station. The apparatus may be configured to implement any method and function related to the terminal device in any one of the foregoing embodiments. The apparatus may include a processing module 801, a sending module 802, and a receiving module 803. Optionally, the sending module 802 and the receiving module 803 correspond to a radio frequency circuit and a baseband circuit that are included in the first base station. The modules are described in detail as follows.

The processing module 801 is configured to determine that a core network device unsuccessfully sends a first data packet to a first base station, or that the first base station unsuccessfully sends a first data packet to a first terminal device.

The sending module 802 is configured to send first indication information to the core network device, where the first indication information indicates that the first data packet is unsuccessfully sent.

Optionally, the receiving module 803 is configured to receive a state report sent by the first terminal device; and the processing module 801 is further configured to determine, based on the state report, that the first base station unsuccessfully sends the first data packet to the first terminal device.

Optionally, the state report includes a serial number of a data packet currently received by the first terminal device or a serial number of a data packet that is not received by the first terminal device.

Optionally, the receiving module 803 is configured to receive a hybrid automatic repeat request HARQ feedback sent by the first terminal device, where the HARQ feedback is for determining that a radio access control MAC protocol data unit PDU is unsuccessfully sent; and the processing module 801 is further configured to determine, based on the MAC PDU, that the first base station unsuccessfully sends the first data packet to the first terminal device.

Optionally, the receiving module 803 is further configured to receive the first data packet sent by the core network device; and the processing module 801 is further configured to: determine whether a serial number of the received first data packet is consecutive; and if the serial number is not consecutive, determine that a previous data packet of the first data packet is unsuccessfully sent.

Optionally, the processing module 801 is further configured to: determine, if the first data packet sent by the core network device is not received before a preset moment, that the first data packet is unsuccessfully sent.

In at least another embodiment:

The processing module 801 is configured to determine that a core network device unsuccessfully sends a first data packet to a first base station, or that the first base station unsuccessfully sends a first data packet to a first terminal device.

The sending module 802 is configured to send first indication information to a second base station, where the first indication information indicates that the first data packet is unsuccessfully sent.

Optionally, a serial number of a data packet of the first base station corresponds to a serial number of a data packet of the second base station.

Optionally, the first indication information may include an identifier of a data radio bearer corresponding to the first data packet or a serial number of the first data packet.

It should be noted that, implementation of each module may further be correspondingly referred to corresponding descriptions in the method embodiments shown in FIG. 3 to FIG. 5, and the method and the functions performed by the first base station in the foregoing embodiments are performed.

Figure 9:
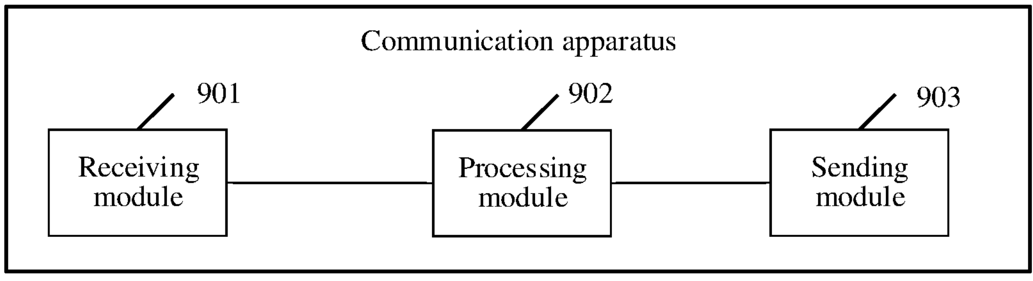
FIG. 9 is a schematic structural diagram of another communication apparatus according to at least one embodiment of this application.

FIG. 9 is a schematic structural diagram of a communication apparatus according to at least one embodiment of this application. The communication apparatus may be a second base station, or a chip or a processing system in the second base station. The apparatus may be configured to implement any method and function related to the terminal device in any one of the foregoing embodiments. The apparatus may include a receiving module 901, a processing module 902, and a sending module 903. Optionally, the receiving module 901 and the sending module 903 correspond to a radio frequency circuit and a baseband circuit that are included in the second base station. The modules are described in detail as follows.

The receiving module 901 is configured to receive second indication information from a core network device, where the second indication information indicates that a first data packet is unsuccessfully sent, and that the first data packet is unsuccessfully sent includes that the core network device unsuccessfully sends the first data packet to a first base station or the first base station unsuccessfully sends the first data packet to a first terminal device.

Optionally, the second indication information includes a serial number of at least one first data packet, a quantity of the at least one first data packet, or a bearer identifier corresponding to the first data packet, and the serial number is for indicating that the first data packet is unsuccessfully sent.

Optionally, the second indication information further includes a quantity of consecutively or accumulatively lost data packets before the first data packet.

Optionally, the receiving module 901 is further configured to receive a fifth data packet from a second terminal device; and the processing module 902 is further configured to: determine whether a serial number of the received fifth data packet is consecutive; and if the serial number is not consecutive, determine that a previous data packet of the fifth data packet is unsuccessfully sent.

Optionally, the processing module 902 is further configured to determine, if the fifth data packet sent by the second terminal device is not received before a preset moment, that the fifth data packet is unsuccessfully sent.

Optionally, the sending module 903 is configured to send a sixth data packet to the core network device, where the sixth data packet includes at least one serial number, the serial number is carried in a header or a data payload of the sixth data packet, and the sixth data packet is for indicating that a data packet corresponding to the serial number is unsuccessfully sent.

Optionally, the sending module 903 is configured to send a sixth data packet to the core network device, where the sixth data packet includes fourth indication information, and the fourth indication information indicates that a previous data packet of the sixth data packet is unsuccessfully sent, a serial number of a data packet that is unsuccessfully sent before the sixth data packet, a quantity of data packets that are unsuccessfully sent accumulatively before the sixth data packet, or a quantity of data packets that are unsuccessfully sent consecutively before the sixth data packet.

It should be noted that, implementation of each module may further be correspondingly referred to corresponding descriptions in the method embodiments shown in FIG. 3 to FIG. 5, and the method and the functions performed by the second base station in the foregoing embodiments are performed.

Figure 10:
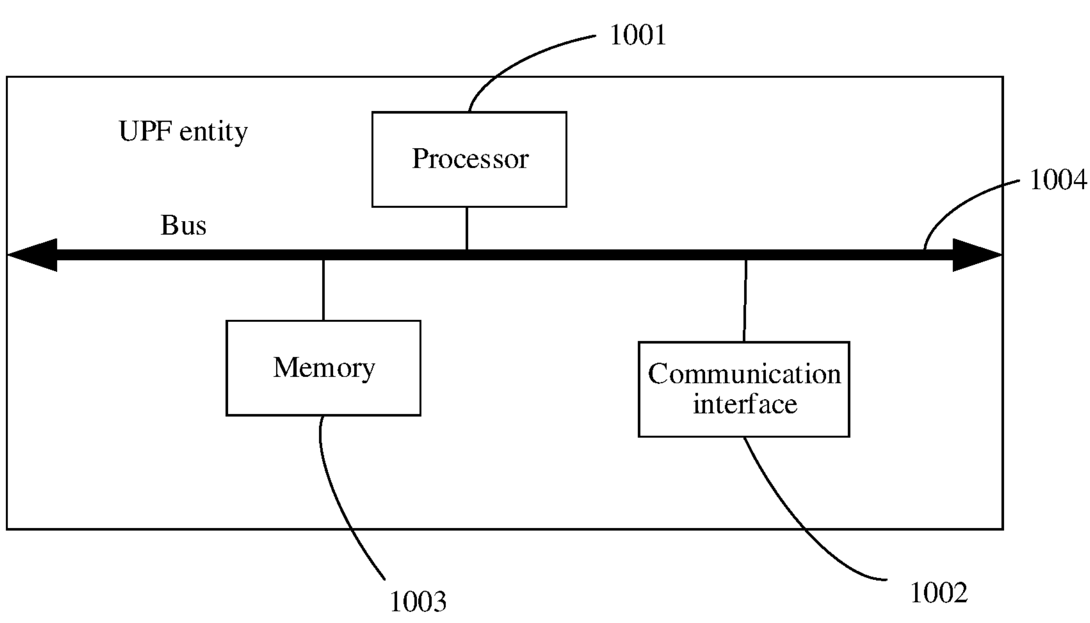
FIG. 10 is a schematic structural diagram of a UPF entity according to at least one embodiment of this application.

FIG. 10 is a schematic structural diagram of a core network device according to at least one embodiment of this application. The core network device may include: at least one processor 1001, at least one communication interface 1002, at least one memory 1003, and at least one communication bus 1004.

The processor 1001 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The communication bus 1004 may be a peripheral component interconnect PCI bus, an extended industry standard architecture EISA bus, or the like. The bus may be classified into an address bus, a data bus, a control bus, and the like. For ease of description, the bus in FIG. 10 is represented by using only one bold line, but it does not indicate that there is only one bus or one type of bus. The communication bus 1004 is configured to implement connection and communication between these components. The communication interface 1002 of the device in at least one embodiment of this application is configured to perform signaling or data communication with another node device. The memory 1003 may include a volatile memory, for example, a nonvolatile dynamic random access memory (NVRAM), a phase change RAM (PRAM), or a magnetoresistive RAM (MRAM). The memory may further include a nonvolatile memory, for example, at least one magnetic disk storage device, an electrically erasable programmable read-only memory (EEPROM), a flash storage device such as a NOR flash memory or a NAND flash memory, or a semiconductor device such as a solid state drive (SSD). Optionally, the memory 1003 may be at least one storage apparatus that is located far away from the foregoing processor 1001. Optionally, the memory 1003 may further store a group of program code. Optionally, the processor 1001 may further execute a program stored in the memory 1003.

First indication information from a first base station is received, where the first indication information indicates that a first data packet is unsuccessfully sent, and that the first data packet is unsuccessfully sent includes that the core network device unsuccessfully sends the first data packet to the first base station or the first base station unsuccessfully sends the first data packet to a first terminal device.

Second indication information is sent to a second base station, where the second indication information indicates that the first data packet is unsuccessfully sent.

Optionally, the second indication information includes one or more of the following: a serial number of the at least one first data packet, a bearer identifier corresponding to the first data packet, a quantity of the at least one first data packet, and a quantity of consecutively or accumulatively lost data packets before the first data packet.

Optionally, the first indication information includes one or more of the following: a serial number of the at least one first data packet, a bearer identifier corresponding to the first data packet, a quantity of the at least one first data packet, and a quantity of consecutively or accumulatively lost data packets before the first data packet.

Optionally, the processor 1001 is further configured to perform the following steps:

receiving a second data packet from the second base station; and determining whether a serial number of the received second data packet is consecutive; and if the serial number is not consecutive, determining that a previous data packet of the second data packet is unsuccessfully sent.

Optionally, the processor 1001 is further configured to perform the following steps:

sending third indication information to the first base station, where the third indication information indicates that the second base station unsuccessfully sends a fourth data packet to the core network device or a second terminal device unsuccessfully sends a fourth data packet to the second base station.

Optionally, the third indication information includes one or more of the following: a serial number of the at least one fourth data packet, a bearer identifier corresponding to the fourth data packet, a quantity of the at least one fourth data packet, and a quantity of consecutively or accumulatively lost data packets before the fourth data packet.

Optionally, the processor 1001 is further configured to perform the following steps:

determining, if a second data packet sent by the second base station is not received before a preset moment, that the second data packet is unsuccessfully sent.

Optionally, the processor 1001 is further configured to perform the following steps:

sending a third data packet to the first base station, where the third data packet includes at least one serial number, the serial number is carried in a header or a data payload of the third data packet, and the third data packet is for indicating that a data packet corresponding to the serial number is unsuccessfully sent.

Optionally, the processor 1001 is further configured to perform the following steps:

sending a third data packet to the first base station, where the third data packet includes fourth indication information, and the fourth indication information indicates that a previous data packet of the third data packet is unsuccessfully sent, a serial number of a data packet that is unsuccessfully sent before the third data packet, a quantity of data packets that are unsuccessfully sent accumulatively before the third data packet, or a quantity of data packets that are unsuccessfully sent consecutively before the third data packet.

Further, the processor may cooperate with the memory and the communication interface to perform the operations of the core network device in the foregoing embodiments of this application.

Figure 11:
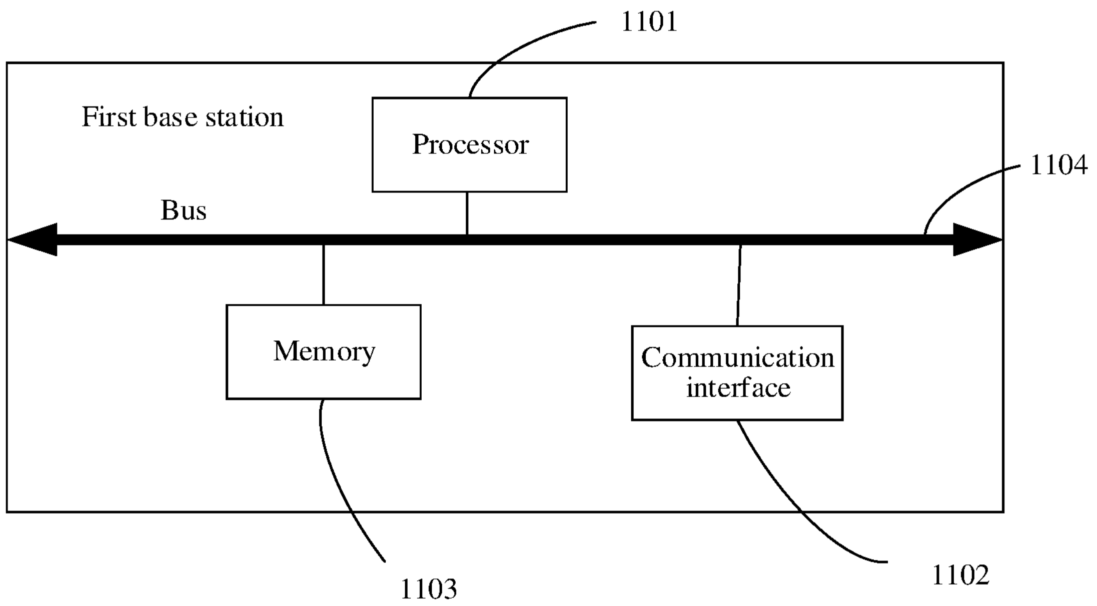
FIG. 11 is a schematic structural diagram of a first base station according to at least one embodiment of this application.

FIG. 11 is a schematic structural diagram of a first base station according to at least one embodiment of this application. The first base station corresponds to a base station 2, and may include: at least one processor 1101, at least one communication interface 1102, at least one memory 1103, and at least one communication bus 1104.

The processor 1101 may be processors of different types mentioned above. The communication bus 1104 may be a peripheral component interconnect PCI bus, an extended industry standard architecture EISA bus, or the like. The bus may be classified into an address bus, a data bus, a control bus, and the like. For ease of description, the bus in FIG. 11 is represented by using only one bold line, but it does not indicate that there is only one bus or one type of bus. The communication bus 1104 is configured to implement connection and communication between these components. The communication interface 1102 of the device in at least one embodiment of this application is configured to perform signaling or data communication with another node device. The memory 1103 may be memories of different types mentioned above. Optionally, the memory 1103 may be at least one storage apparatus that is located far away from the foregoing processor 1101. The memory 1103 stores a group of program code, and the processor 1101 executes a program in the memory 1103.

It is determined that a core network device unsuccessfully sends a first data packet to the first base station, or that the first base station unsuccessfully sends a first data packet to a first terminal device.

First indication information is sent to the core network device, where the first indication information indicates that the first data packet is unsuccessfully sent.

Optionally, the processor 1101 is further configured to perform the following steps:

receiving a state report sent by the first terminal device; and determining, based on the state report, that the first base station unsuccessfully sends the first data packet to the first terminal device.

Optionally, the state report includes a serial number of a data packet currently received by the first terminal device or a serial number of a data packet that is not received by the first terminal device.

Optionally, the processor 1101 is further configured to perform the following steps:

receiving a hybrid automatic repeat request HARQ feedback sent by the first terminal device, where the HARQ feedback is for determining that a radio access control MAC protocol data unit PDU is unsuccessfully sent; and determining, based on the MAC PDU, that the first base station unsuccessfully sends the first data packet to the first terminal device.

Optionally, the processor 1101 is further configured to perform the following steps:

receiving the first data packet sent by the core network device; and determining whether a serial number of the received first data packet is consecutive; and if the serial number is not consecutive, determining that a previous data packet of the first data packet is unsuccessfully sent.

Optionally, the processor 1101 is further configured to perform the following steps:

determining, if the first data packet sent by the core network device is not received before a preset moment, that the first data packet is unsuccessfully sent.

In at least another embodiment:

It is determined that a core network device unsuccessfully sends a first data packet to the first base station, or that the first base station unsuccessfully sends a first data packet to a first terminal device.

The first base station sends first indication information to the second base station. The first indication information indicates that the first data packet is unsuccessfully sent.

Optionally, a serial number of a data packet of the first base station corresponds to a serial number of a data packet of the second base station.

Optionally, the first indication information may include an identifier of a data radio bearer corresponding to the first data packet or a serial number of the first data packet.

Further, the processor may cooperate with the memory and the communication interface to perform the operations of the first base station in the foregoing embodiments of this application.

Figure 12:
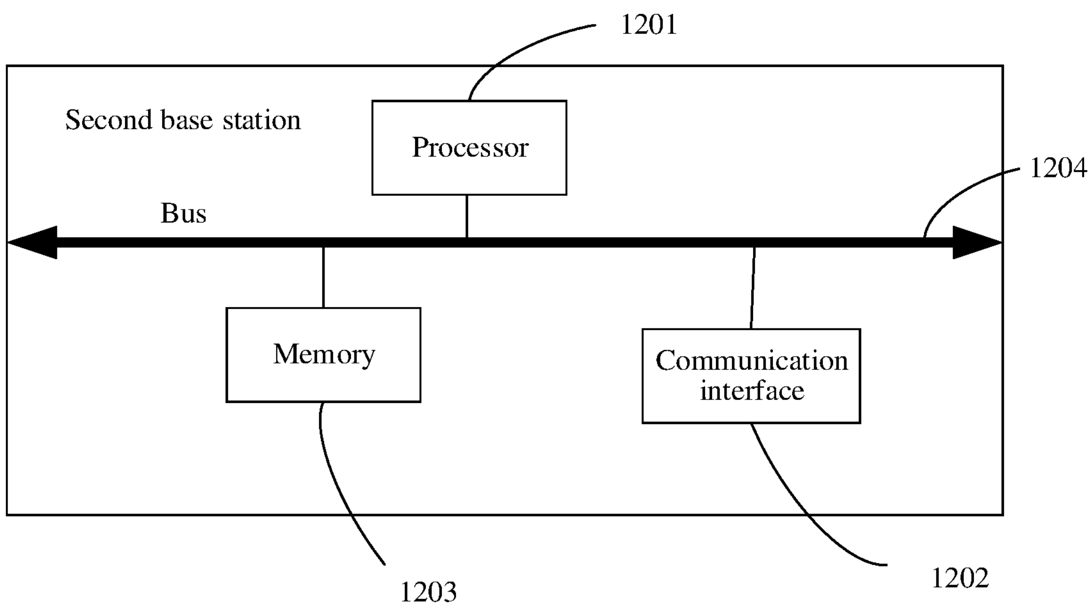
FIG. 12 is a schematic structural diagram of a second base station according to at least one embodiment of this application.

FIG. 12 is a schematic structural diagram of a second base station according to at least one embodiment of this application. The second base station corresponds to a base station 1, and may include: at least one processor 1201, at least one communication interface 1202, at least one memory 1203, and at least one communication bus 1204.

The processor 1201 may be processors of different types mentioned above. The communication bus 1204 may be a peripheral component interconnect PCI bus, an extended industry standard architecture EISA bus, or the like. The bus may be classified into an address bus, a data bus, a control bus, and the like. For ease of description, the bus in FIG. 12 is represented by using only one bold line, but it does not indicate that there is only one bus or one type of bus. The communication bus 1204 is configured to implement connection and communication between these components. The communication interface 1202 of the device in at least one embodiment of this application is configured to perform signaling or data communication with another node device. The memory 1203 may be memories of different types mentioned above. Optionally, the memory 1203 may be at least one storage apparatus that is located far away from the foregoing processor 1201. The memory 1203 stores a group of program code, and the processor 1201 executes a program in the memory 1203.

Second indication information is received from a core network device, where the second indication information indicates that a first data packet is unsuccessfully sent, and that the first data packet is unsuccessfully sent includes that the core network device unsuccessfully sends the first data packet to a first base station or the first base station unsuccessfully sends the first data packet to a first terminal device.

Optionally, the second indication information includes a serial number of at least one first data packet, a quantity of the at least one first data packet, or a bearer identifier corresponding to the first data packet, and the serial number is for indicating that the first data packet is unsuccessfully sent.

Optionally, the second indication information further includes a quantity of consecutively or accumulatively lost data packets before the first data packet.

Optionally, the processor 1201 is further configured to perform the following steps:

receiving a fifth data packet from a second terminal device; and determining whether a serial number of the received fifth data packet is consecutive; and if the serial number is not consecutive, determining that a previous data packet of the fifth data packet is unsuccessfully sent.

Optionally, the processor 1201 is further configured to perform the following steps:

determining, if a fifth data packet sent by a second terminal device is not received before a preset moment, that the fifth data packet is unsuccessfully sent.

Optionally, the processor 1201 is further configured to perform the following steps:

sending a sixth data packet to the core network device, where the sixth data packet includes at least one serial number, the serial number is carried in a header or a data payload of the sixth data packet, and the sixth data packet is for indicating that a data packet corresponding to the serial number is unsuccessfully sent.

Optionally, the processor 1201 is further configured to perform the following steps:

sending a sixth data packet to the core network device, where the sixth data packet includes fourth indication information, and the fourth indication information indicates that a previous data packet of the sixth data packet is unsuccessfully sent, a serial number of a data packet that is unsuccessfully sent before the sixth data packet, a quantity of data packets that are unsuccessfully sent accumulatively before the sixth data packet, or a quantity of data packets that are unsuccessfully sent consecutively before the sixth data packet.

Further, the processor may cooperate with the memory and the communication interface to perform the operations of the second base station in the foregoing embodiments of this application.

At least one embodiment of this application further provides a chip system. The chip system includes a processor, and the processor is configured to support a base station or a core network device to implement the functions in any one of the foregoing embodiments, for example, to generate or process the first indication information or the second indication information in the foregoing methods. In a possible design, the chip system further includes a memory. The memory is configured to store a program instruction and data necessary to a base station or a core network device. The chip system may include a chip, or may include a chip and another discrete component.

At least one embodiment of this application further provides a processor. The processor is configured to be coupled to a memory, and is configured to perform any method and function related to the base station or the core network device in any one of the foregoing embodiments.

At least one embodiment of this application further provides a computer program product including instructions. When the computer program product is run on a computer, the computer is enabled to perform any method and function related to the base station or the core network device in any one of the foregoing embodiments.

At least one embodiment of this application further provides an apparatus, and the apparatus is configured to perform any method and function related to the base station or the core network device in any one of the foregoing embodiments.

At least one embodiment of this application further provides a wireless communication system. The system includes at least one base station and at least one core network device in any one of the foregoing embodiments.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a non-transitory computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The objectives, technical solutions, and beneficial effects of this application are further described in detail in the foregoing specific implementations. Any modification, equivalent replacement, or improvement made without departing from the spirit and principle of this application shall fall within the protection scope of this application.

The invention claimed is:

1. A packet loss indication method, comprising:

receiving, by a core network device, first indication information from a first base station, wherein the first indication information indicates that a first data packet was unsuccessfully sent, and that the first data packet was unsuccessfully sent comprises that the core network device unsuccessfully sent the first data packet to the first base station or the first base station unsuccessfully sent the first data packet to a first terminal device;

sending, by the core network device, second indication information to a second base station, wherein the second indication information indicates that the first data packet was unsuccessfully sent; and sending, by the core network device, a third data packet to the first base station, wherein the third data packet comprises at least one serial number which is carried in a header or a data payload of the third data packet, and the third data packet indicates that at least one data packet corresponding to the at least one serial number was unsuccessfully sent, or wherein the third data packet comprises fourth indication information, and the fourth indication information indicates:

that a previous data packet of the third data packet was unsuccessfully sent, a serial number of a data packet that was unsuccessfully sent before the third data packet, a quantity of data packets that were unsuccessfully sent accumulatively before the third data packet, or a quantity of data packets that were unsuccessfully sent consecutively before the third data packet.

2. The method according to claim 1, wherein the second indication information comprises at least one of:

at least one serial number of at least one data packet, the at least one data packet including the first data packet, a bearer identifier corresponding to the first data packet, a quantity of the at least one data packet, or a quantity of consecutively or accumulatively lost data packets before the first data packet.

3. The method according to claim 1, wherein the first indication information comprises at least one of:

at least one serial number of at least one data packet, the at least one data packet including the first data packet, a bearer identifier corresponding to the first data packet, a quantity of the at least one data packet, or a quantity of consecutively or accumulatively lost data packets before the first data packet.

4. The method according to claim 1, further comprising:

determining, by the core network device in response to a second data packet sent by the second base station not being received before a preset moment, that the second data packet was unsuccessfully sent.

5. The method according to claim 1, further comprising:

sending, by the core network device, third indication information to the first base station, wherein the third indication information indicates that:

the second base station unsuccessfully sent a fourth data packet to the core network device, or a second terminal device unsuccessfully sent a fourth data packet to the second base station.

6. The method according to claim 5, wherein the third indication information comprises at least one of:

at least one serial number of at least one data packet, the at least one data packet including the fourth data packet, a bearer identifier corresponding to the fourth data packet, a quantity of the at least one data packet, or a quantity of consecutively or accumulatively lost data packets before the fourth data packet.

7. A communication apparatus, comprising:

at least one processor; and a memory coupled to the at least one processor and configured to store instructions executable by the at least one processor to cause the communication apparatus to:

determine that a core network device unsuccessfully sent a first data packet to the apparatus, or that the apparatus unsuccessfully sent a first data packet to a first terminal device; and send first indication information to the core network device, wherein the first indication information indicates that the first data packet was unsuccessfully sent, wherein the instructions are executable by the at least one processor to further cause the apparatus to receive a third data packet from the core network device, and wherein the third data packet comprises:

at least one serial number which is carried in a header or a data payload of the third data packet, and the third data packet indicates that at least one data packet corresponding to the at least one serial number was unsuccessfully sent, or fourth indication information, and the fourth indication information indicates:

that a previous data packet of the third data packet was unsuccessfully sent, a serial number of a data packet that was unsuccessfully sent before the third data packet, a quantity of data packets that were unsuccessfully sent accumulatively before the third data packet, or a quantity of data packets that were unsuccessfully sent consecutively before the third data packet.

8. The apparatus according to claim 7, wherein the instructions are executable by the at least one processor to further cause the apparatus to:

receive a state report sent by the first terminal device; and determine, based on the state report, that the apparatus unsuccessfully sent the first data packet to the first terminal device.

9. The apparatus according to claim 8, wherein the state report comprises:

a serial number of a data packet currently received by the first terminal device, or a serial number of a data packet that was not received by the first terminal device.

10. The apparatus according to claim 7, wherein the instructions are executable by the at least one processor to further cause the apparatus to:

determine, in response to the first data packet sent by the core network device not being received before a preset moment, that the core network device unsuccessfully sent the first data packet to the apparatus.

11. A communication apparatus, comprising:

at least one processor; and a memory coupled to the at least one processor and configured to store instructions executable by the at least one processor to cause the communication apparatus to:

receive second indication information from a core network device, wherein the second indication information indicates that a first data packet was unsuccessfully sent, and that the first data packet was unsuccessfully sent comprises that the core network device unsuccessfully sent the first data packet to a first base station or the first base station unsuccessfully sent the first data packet to a first terminal device, and send a sixth data packet to the core network device, wherein the sixth data packet comprises at least one serial number which is carried in a header or a data payload of the sixth data packet, and the sixth data packet indicates that at least one data packet corresponding to the at least one serial number was unsuccessfully sent, or wherein the sixth data packet comprises fourth indication information, and the fourth indication information indicates:

that a previous data packet of the sixth data packet was unsuccessfully sent, a serial number of a data packet that was unsuccessfully sent before the sixth data packet, a quantity of data packets that were unsuccessfully sent accumulatively before the sixth data packet, or a quantity of data packets that were unsuccessfully sent consecutively before the sixth data packet.

12. The apparatus according to claim 11, wherein the second indication information comprises:

at least one serial number of at least one data packet, the at least one data packet including the first data packet, a quantity of the at least one data packet, or a bearer identifier corresponding to the first data packet.

13. The apparatus according to claim 12, wherein the second indication information further comprises:

a quantity of consecutively or accumulatively lost data packets before the first data packet.

14. The apparatus according to claim 11, wherein the instructions are executable by the at least one processor to further cause the apparatus to:

determine, in response to a fifth data packet sent by a second terminal device not being received before a preset moment, that the fifth data packet was unsuccessfully sent.

* * * * *